(12) United States Patent
Page et al.

(10) Patent No.: US 7,359,489 B2
(45) Date of Patent: Apr. 15, 2008

(54) METHOD AND APPARATUS FOR INCLUSIVE ECHO CANCELLER TESTING

(75) Inventors: William B. Page, Hudson, MA (US); Yan Wang, Arlington, MA (US); Timothy G. Wade, Litchfield, NH (US); Mark Milot, Nashua, NH (US); Ibrahim Yavuz, Arlington, MA (US); David Cheng-Song Qi, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 629 days.

(21) Appl. No.: 10/981,832

(22) Filed: Nov. 5, 2004

(65) Prior Publication Data

US 2006/0098807 A1    May 11, 2006

(51) Int. Cl.
*H04M 1/24* (2006.01)
*H04M 3/08* (2006.01)
*H04M 3/22* (2006.01)

(52) U.S. Cl. .......................................................... 379/3

(58) Field of Classification Search ..................... 379/3
See application file for complete search history.

(56) References Cited

U.S. PATENT DOCUMENTS 5,412,754 A * 5/1995 Le Cun et al. ............... 706/31
5,602,836 A * 2/1997 Papadopoulos et al. ..... 370/280

OTHER PUBLICATIONS

"Digital Network Echo Cancellers," ITU-T Recommendation G.168, (Apr. 2000).

* cited by examiner

*Primary Examiner*—Curtis A Kuntz
*Assistant Examiner*—Alexander Jamal
(74) *Attorney, Agent, or Firm*—Hamilton, Brook, Smith & Reynolds, P.C.

(57) ABSTRACT

A testing and performance analysis methodology applies a series of test vector pairs to the input ports of an echo canceller under test. The test vector signal pair may represent a particular speech activity state transition, e.g., a Brady Model transition. A scoring compression function such as a sigmoid squashing function is used to evaluate quantized performance parameters. The sub-scores may be weighted and averaged to provide an overall performance score.

24 Claims, 11 Drawing Sheets

| TIME | FILE | ERLE_f | ERLE75 | ERLE_d | DIV_DUR | NV_LOSS | RE_CORR | DIF_CNG | COMP.SCORE |
|---|---|---|---|---|---|---|---|---|---|
| 14:20:01 | 725 | 25.1 | 9.3 | 18.6 | 0.0 | 0.0 | 0.3% | -6.5 | 79.0 |
| 14:24:23 | 726 | 23.5 | 9.5 | 15.5 | 161.9 | 0.0 | 0.0% | -2.1 | 81.7 |
| 14:28:16 | 727 | 21.1 | 9.4 | 15.2 | 149.5 | 0.0 | 1.7% | 2.6 | 80.3 |
| 14:30:55 | 728 | 16.6 | 8.6 | 12.5 | 17.9 | 0.0 | 9.3% | 13.3 | 64.2 |
| 14:33:56 | 729 | 12.2 | 9.2 | 10.4 | 0.0 | 0.0 | 19.8% | 22.3 | 55.2 |
| 14:39:06 | 730 | 0.8 | 0.1 | 1.0 | 0.0 | 0.3 | 82.3% | 48.2 | 29.3 |

FIG. 9

METHOD AND APPARATUS FOR INCLUSIVE ECHO CANCELLER TESTING

BACKGROUND

During some telephone conversations a talker can hear a delayed copy of the talker's own voice emanating from the telephone receiver. This phenomenon is known as talker echo. Talker echo is caused by signal reflections in the telephone network and acoustics. Echo becomes increasingly annoying to the talker as the echo increases either in volume or delay relative to the talker's speech.

When an electrical wave travels down a wire, the electrical energy can be reflected back if there is a change in impedance at any point in the transmission path. In the analog portion of a telephone network this impedance mismatch occurs most significantly at the hybrid that does a 4-wire to 2-wire conversion. If the impedances are well matched very little signal is reflected. However, when there is a large impedance mismatch, most of the signal can be reflected. This reflection at the hybrid is referred to as "Hybrid Echo".

Echo cancellers are used in the telephone network to remove (cancel) these reflections (echo) to as great a degree as possible. Much of this cancellation requires the echo canceller to compare an outgoing signal, which may contain a talker's speech signals and/or noise signals, to an incoming signal. The incoming signal may at times contain noise signals, an echo of the "outgoing" talker's speech signal and/or a speech signal from a second "incoming" talker. The echo canceller is designed to eliminate or reduce the echo by synthesizing a replica of the echo which is subtracted from the actual circuit echo.

In traditional circuit-switched networks, the echo cancellers can be placed in the 4-wire portion of a circuit. In a modem Voice over IP (VoIP) network, the echo canceller is also an important apparatus that can be either placed independently between a VoIP gateway and hybrids, or, more commonly, integrated with the VoIP gateway internally.

For an echo canceller to function properly, it needs to be able to determine if the incoming signal contains speech from a local source (near-end speech) or the echo of an outgoing signal. This determination is often referred to as "double talk" detection. A common method for double-talk detection is to compare the outgoing signal to the incoming signal. The louder the volume of the echo with respect to the volume of the outgoing signal, the more difficult this determination becomes.

The ratio of the power of the echo to the power of the outgoing signal is referred to as the echo return loss (ERL). The ERL is equal to the amount of power that is lost from the transmitted signal when the signal is echoed back. ERL is said to be "lower" when the returning echo is close to the same volume of the outgoing signal. The ERL is "higher" when the echo returns at a more reduced volume. Without echo cancellation in the telephone network, telephone calls with low ERLs have more audible echo than calls with high ERLs.

There are two broad classes of speech quality metrics: subjective and objective. Subjective measurements involve humans listening to a live or recorded conversation and assigning a rating to it. One of the most widely used and recognized subjective measure is the mean opinion score (MOS). The ITU-T Recommendation P.831 describes in detail how to conduct a subjective evaluation of network echo cancellers.

The ITU-T Recommendations P.861 and P.862 describe two objective speech quality measurement methods known as PSQM (Perceptual speech quality measurement) and PESQ (Perceptual evaluation of speech quality). They can measure and score the effects of one-way speech distortion and noise on speech quality. However, they cannot reflect other impairments related to two-way interaction such as echo.

The section 6.2 of ITU-T Recommendation G.168 describes a series of test methods in terms of evaluating echo canceller performance. These tests can evaluate the performance of some of the major echo canceller functions such as convergence depth and speed by simulating simple single and double talk conversation scenarios using Composite Source Signals (CSS) bursts.

SUMMARY

There are difficulties with the known testing approaches. Subjective metrics such as MOS can be time-consuming and expensive. Further, many organization may not have the resources to conduct such tests.

The objective tests of G.168 show some limitations as well. In particular, the double talk tests described in Test No. 3 are based on a simple double talk model and do not address all the possible speaker models and talk spurt state transitions that can be found in a real conversation. Data collected from live networks shows that the speaker models and state transitions may seriously affect the echo canceller convergence performance as well as its non-linear processor functionality.

The test methods of G.168 Section 6.2 are on a measure-after-convergence basis. They require an adaptation inhibit mechanism to freeze the echo canceller's convergence for the purpose of measurement. This intrusive operation has to be done in a timely manner and may not always be possible or reliable with all echo cancellers.

Almost all G.168 tests only evaluate the echo canceller by measuring the power level of residual signals after the adaptation freezing. Such tests do not reflect many other critical factors which can impact the overall speech quality greatly, for instance, the divergence during double talk, voice clipping, NLP engagement/disengagement delay, etc.

Although G.168 presents a set of passing/failing criteria to the test results, it does not define a process of quantizing and scoring the echo canceller performance on an overall basis or with respect to specific categories. This may bring difficulties in analyzing and comparing test results in a statistical manner.

It has been found that even if a particular echo canceller implementation can pass the G.168 tests, it may not provide satisfactory performance under some circumstances in real networks.

Thus, there is a need for a testing and performance analysis methodology that can overcome the limitations of G.168 and other current speech quality testing methods.

According to the present approach, a novel echo canceller testing and performance analysis methodology applies a series of test vector pairs to the input ports of an echo canceller under test. A scoring compression approach is used to analyze and evaluate quantized performance parameters.

Accordingly, a method of testing an echo canceller that has receive input (Rin), receive output (Rout), send input (Sin) and send output (Sout) ports comprises applying at least one test vector signal pair to the respective Rin, Sin ports; analyzing the Sout signal generated to derive one or more performance parameters; and scoring the performance parameters to characterize the echo canceller. The test vector signal pair may represent a particular speech activity state transition, e.g., a Brady Model transition.

The Rin test vector signal may include a speech component and a noise component. The Sin test vector signal may include a speech component, a noise component and an echo component.

The performance parameters may include a measure of echo return loss enhancement (ERLE), including ERLE during a far-end single talk speech activity state, ERLE during a double talk speech activity state and ERLE during an initial interval of a far-end single talk speech activity state. Another performance parameter may include maximum divergence duration in the event ERLE drops below a threshold. Other performance parameters may include measures indicative of near-end voice clipping, residue echo leakage and comfort noise power. The performance parameters may include parameters associated with a non-linear processor of the echo canceller being enabled or disabled or both.

In a test arrangement, the echo canceller may be located at a terminating gateway coupled to an originating gateway across a packet network. In this arrangement, applying includes sending the Rin test vector signal to the originating gateway and sending the Sin test vector signal to the terminating gateway through a circuit switched network.

According to another aspect, the method may further include generating at least one test vector signal pair by combining a first speech component and a first noise component to provide the Rin test vector signal and combining a second speech component, a second noise component and an echo component to provide the Sin test vector signal. The speech components may include periodic artificial speech bursts or recorded voice. The noise components may comprise continuous noise sequence. The echo component may be pre-generated or generated by applying an echo path model in real time or near real time.

According to another aspect, scoring may include scoring each performance parameter by a sigmoid squashing function to provide a sub-score for each performance parameter. The sub-scores may be weighted and averaged to provide an overall performance score.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a table of sample results for the testing arrangement of FIG. 7.

DETAILED DESCRIPTION

An improved approach for testing the performance of digital echo cancellers is disclosed herein. With this approach, a series of test vector pairs are generated and applied to an echo canceller under test. Each particular input signal pair or test vector consists of receive-in (Rin) and send-in (S-in) digital signals. Many of these input signal pairs simulate many of the possible scenarios in the real networks which can impact the performance of an echo canceller. In particular, the test vectors each represent a particular combination of echo return loss (ERL), echo path model, echo path delay, talker speech power levels, noise power levels, and talker burst model transitions, etc. By analyzing and scoring the send-out (Sout) signals of the echo canceller device from multiple angles, the echo canceller's performance can be measured on an objective basis. Also, the analysis results of different echo cancellers can be compared on an overall basis or from a particular aspect.

Prior to describing the test methodology of the present approach, it is helpful to understand the functions of a typical echo canceller and briefly review the Markov Chain model (Brady Model) for modeling speech activity states and transitions.

Figure 1:
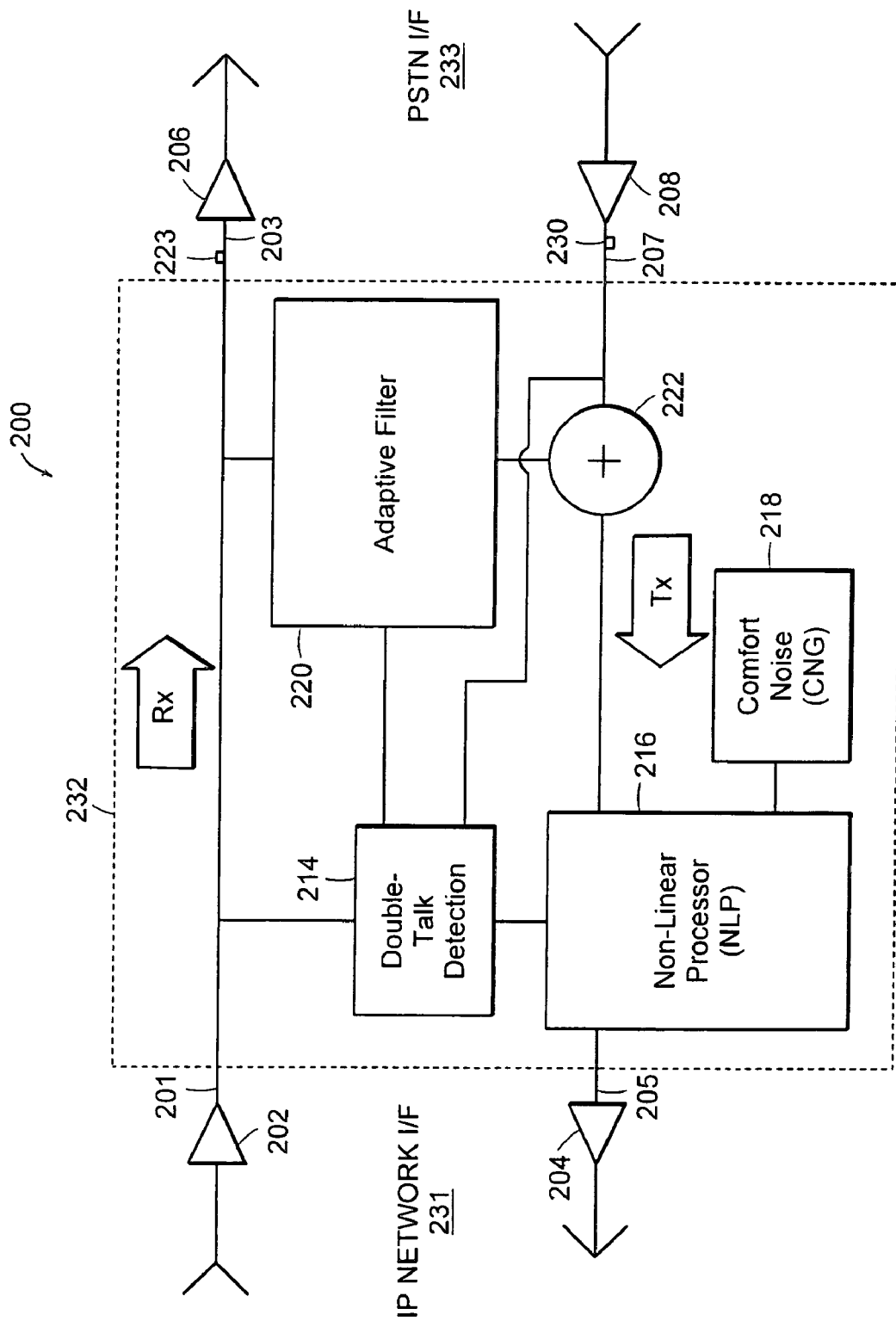
FIG. 1 is a block diagram of a typical echo canceller.

FIG. 1 is a block diagram that illustrates an echo canceller 200. The echo canceller includes an echo canceller circuit 232 that comprises an adaptive filter 220, double-talk detection 214, non-linear processor (NLP) 216 and comfort noise generator (CNG) 218. The echo canceller is coupled between packet network interface 231 and switched network interface 233. A receive path (Rx) couples a far-end signal at Rin port 201 from the packet network interface to the switched network interface at Rout port 203. A transmit path (Tx) couples a near-end signal at Sin port 207 from the switched network interface to the packet network interface at Sout port 205. The echo canceller circuit 232 is coupled to the receive path and the transmit path for filtering far-end echo from the near-end signal. The echo canceller 200 may also include attenuation 202, 206 and 204, 208 in the respective receive and transmit paths of the circuit. ERLE may typically be measured with respect to the points 228, 230.

With reference to the echo canceller 200, "near-end" refers to the PSTN side. The near-end signal is received from the PSTN and includes near-end voice, far-end echo and noise components. "Far-end" refers to the IP network side. The far-end signal is received from the IP network.

It should be understood that, while the embodiments described further herein refer to arrangements that include VoIP gateways, other embodiments in accordance with the principles of the invention may have digital circuit switches or other switches well-known in a TDM network, without having VoIP nodes present. That is, the principles of the present invention are applicable for use with digital echo cancellers in both VoIP and TDM applications.

The typical functions of the echo canceller are now described at a high level. The adaptive filter 220 is configured to statistically model the nature of the echo so that it may predict the amount of echo returned from the hybrid 224. Then the predicted echo can be subtracted from the incoming signal at summing block 222. If the echo is accurately predicted it is hence removed. However, there are limits on how accurate that prediction can be made and therefore, a residual echo is generally always present. The adaptive filter functions better if it changes characteristics based on the presence of near-end speech.

The non-linear processor (NLP) 216 provides a way to remove this residual echo. Simply, the nonlinear processor attenuates any signal that is output from the adaptive filter 220. This signal may contain residual echo, near-end talk, and near-end noise. When the NLP attenuates, all of these signal components are affected. Since attenuating the near-end talk is highly undesirable, the NLP should be engaged (add attenuation) or disengaged (pass the signal) at the proper time.

The double-talk detector 214 determines when the NLP is to be engaged. The human brain is very good at picking out voice signals from noise or separating different voice streams. Making this decision using DSP processing in a manner such that the human brain will not pick up the errors is very complex and difficult to do.

The comfort noise generation (CNG) 218 replaces some of the near-end noise that is attenuated by the NLP. If no CNG is added when the NLP engages, listeners often hear uncomfortable silences as if the phone has gone dead. The goal of the CNG is to replicate the noise on the incoming signal so listeners are not annoyed when the "true noise" is removed with the residual echo.

As noted above, one problem with an NLP is that the attenuation it applies cannot target the echo alone. That is, all of the components that make up the near-end signal; speech, echo, and noise, will be affected. For these reasons the attenuation is only added during certain times in the call.

Figure 2:
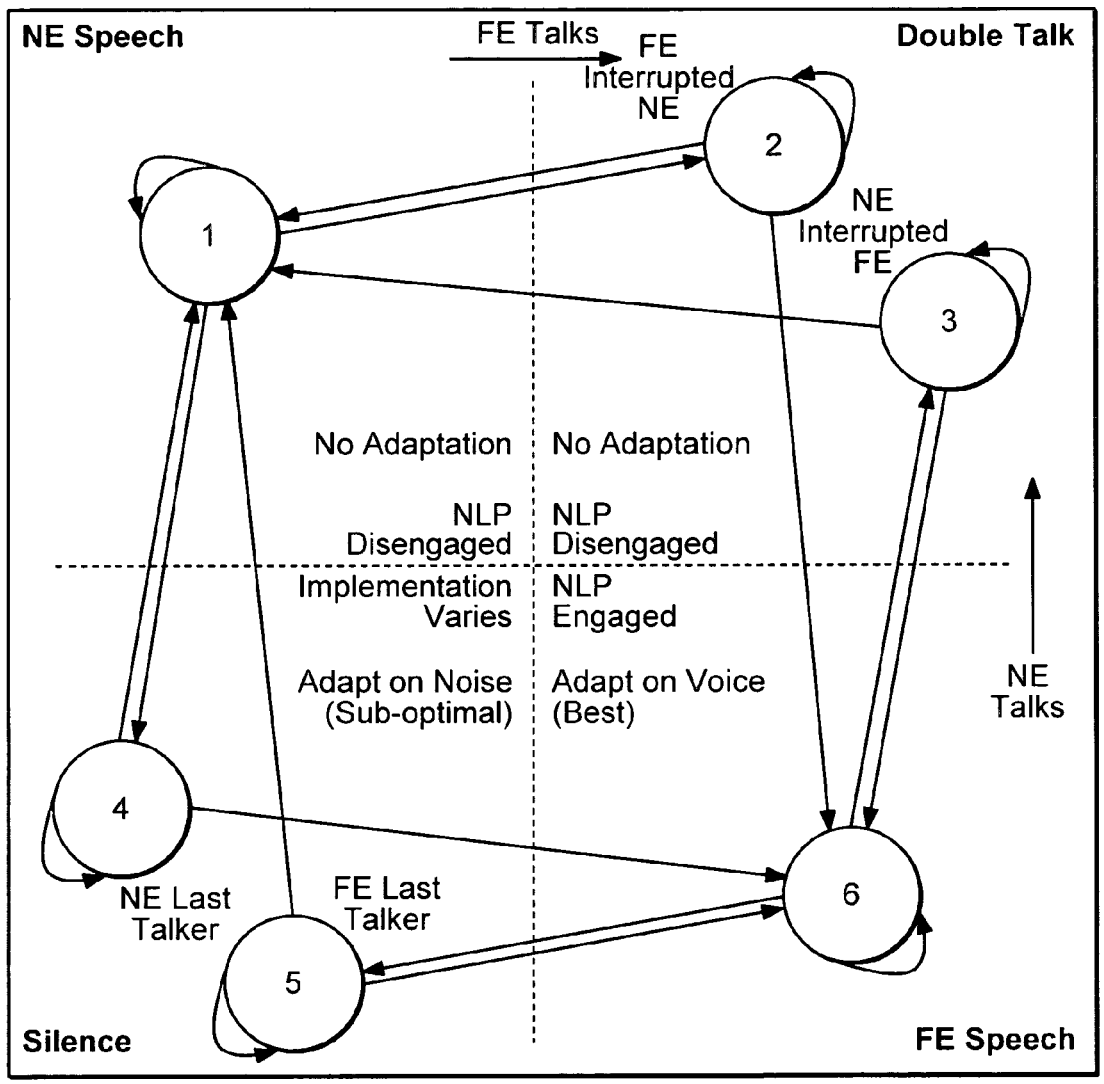
FIG. 2 illustrates a Brady Model of speaker state transitions.

During a telephone conversation there are transitions between periods of silence and periods of speech. FIG. 2 is a state diagram, often referred to as the "Brady Model", that shows the conditions of speech and silence that may occur in a conversation (see P. T. Brady, "A model for generating on-off speech patterns in two-way conversation," Bell Syst. Tech. J., September 1969, pp. 2445-2472.).

In the states on the top half of the state diagram the near-end talker is speaking, in the bottom half they are silent. In the states on the right hand side of the diagram the far-end talker is speaking, and on the left they are silent.

The adaptive filter 220 (FIG. 1) can only adapt when there is a far-end talker, and adapts best when there is no near-end talker. So the best adaptation occurs in state #6. Adaptation can occur in states #4 and #5 as there is always noise present, but adaptation slows when the far-end signal is small. In state #1 again the far-end signal is small so adaptation slows and it is best not to adapt as the near-end signal is mostly speaker. However, it is during the double-talk states, #2 and #3, that adaptation is the worst, as there are both a strong far-end signal and a near-end signal present that are mostly speaker. Hence the name double talk detection. However, as it can be seen it is best to detect all states rather than just the state of double-talk.

The NLP needs to be engaged during periods of far end talk to remove the echo, but it cannot engage during periods of near-end talk or the near-end talker's speech will be removed. When the NLP does not engage at the proper time, the residual echo will "leak" back to the far-end. When the NLP does not disengage at the right time, the far-end will hear the near-end talkers speech be "clipped" or "squelched". During periods of silence the state of the NLP does not really matter, however if we could predict whether the next state would be #6 or #1 we could "pre-set" the state of the NLP. This "pre-set" is one way the Brady model states #4 and #5 can be handled differently.

As shown in the Brady Model state diagram, there are two states that exist in the "silence" and "double-talk" states. These states are split because in typical conversations there are often short transitions into these states. During the early period of any transition into one of these states there is large probability that the state will re-transition back into the state it just came from. For example, when the far-end talker is speaking (in state #6) and they go silent (we enter state #5) there is a much higher probability that the far-end talker will speak again (back to state #6) than there is that the near-end talker will speak (we enter state #1). The longer we are in state #5 the more even the probabilities of entering state #6 or #1 become. Since the NLP is engaged in state #6 it would make sense to keep the NLP engaged during the early period of state #5 since we expect to go right back to state #6.

When a near-end talker and far-end talker speak simultaneously (a period of double-talk), it is necessary that the power in the near-end signal will be higher than the highest expected echo level. If at any time near-end speech is not higher than this level, the quadrant will be misdetected and the echo canceller will act as though it is in the far-end speech only quadrant. When this misdetection happens the NLP will engage and attenuate the near-end signal. Also, the adaptive filter will attempt to adapt on the near-end signal and may diverge.

Having described a typical digital echo canceller and the six-state Markov Chain (Brady model), a test arrangement in accordance with the present approach for echo canceller testing is now described with reference to FIG. 3. The test arrangement includes test signals 303, 305 that are applied to the receive-input (Rin) and send-input (Sin) ports 311, 315, respectively, of an echo canceller under test 300. The complete signal 309 at send-output (Sout) port 317 is then captured or recorded at analyzer/recorder 308 for analysis as described further herein.

The Rin, Sin test signals 303, 305 together are referred to as a test vector pair. Each test vector pair, with different combinations of signal characteristics such as speech power level, noise level, speech burst period, speech burst starting time, speech burst duration, echo model, echo path delay, echo path return loss (ERL) and speaker model transition pattern, defines a particular testing unit that generates a single echo canceller output signal Sout 309. Numerous test units together simulate most conversation scenarios in full range in real voice telecommunications networks.

Figure 3:
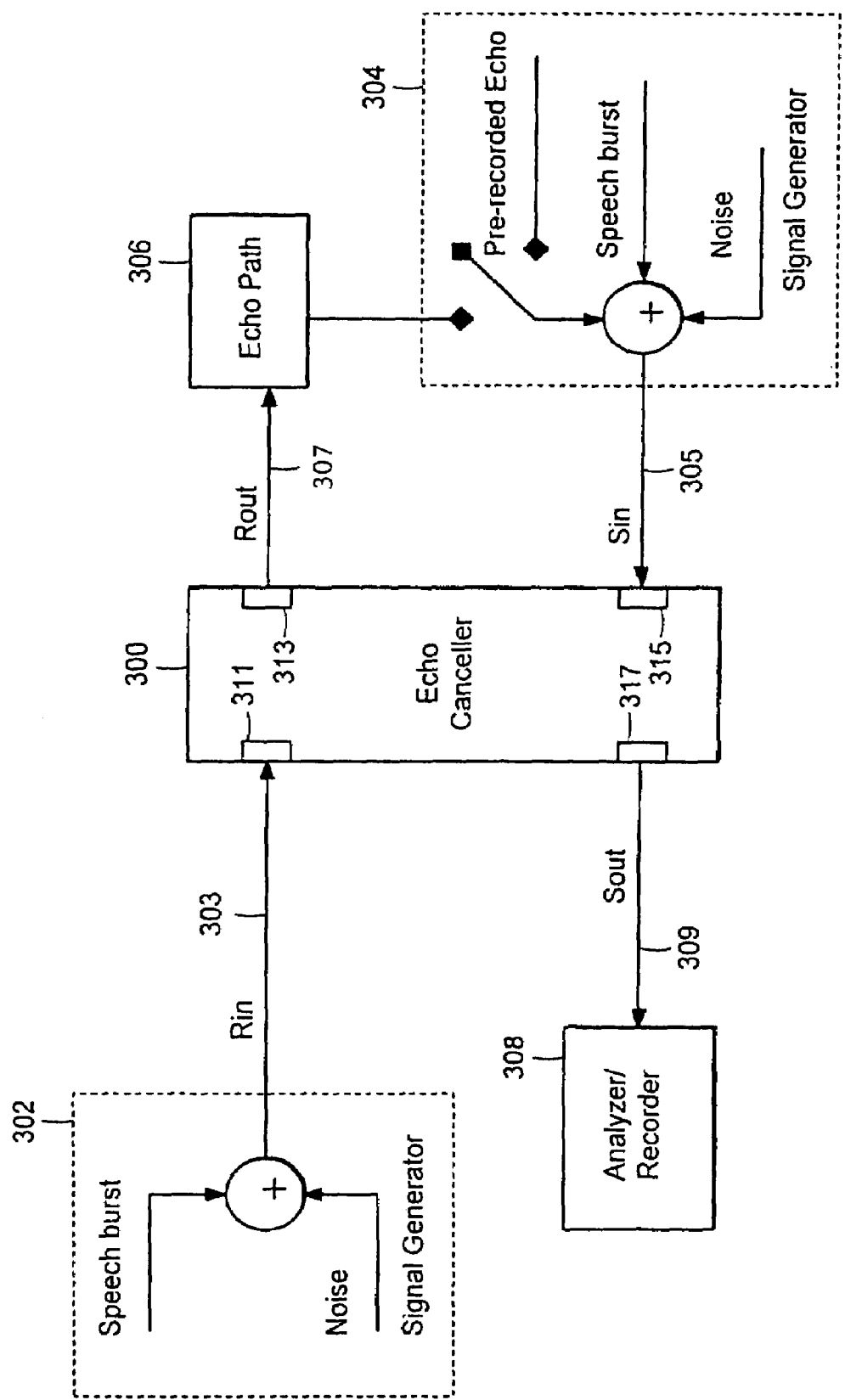
FIG. 3 is block diagram illustrating a test arrangement.

The Rin test signals 303 can be formed by the addition of periodical artificial speech burst components and continuous noise sequence component, as shown at 302 of FIG. 3. The artificial speech bursts may have stationary RMS power level and speech-like power density spectrum. The noise sequence may also have stationary power level, and noise power density spectrum with Hoth noise model (ITU-T Recommendation P.800).

The Sin test signals 305 can be formed by the addition of periodical artificial speech burst components, continuous noise sequence and echo of the corresponding Rin signals, as shown at 304. The requirement of speech burst components and noise sequence component are similar to that of the Rin signal; however, the correlation between the speech sequence of Pin and Sin is preferably low. The echo sequence can be pre-generated or generated by applying an echo path model 306 to the Rout signal 307 at port 313 in a real-time manner depending on different test arrangements. The echo path model specifies a combination of echo path delay, echo path filter pattern and ERL.

Figure 4:
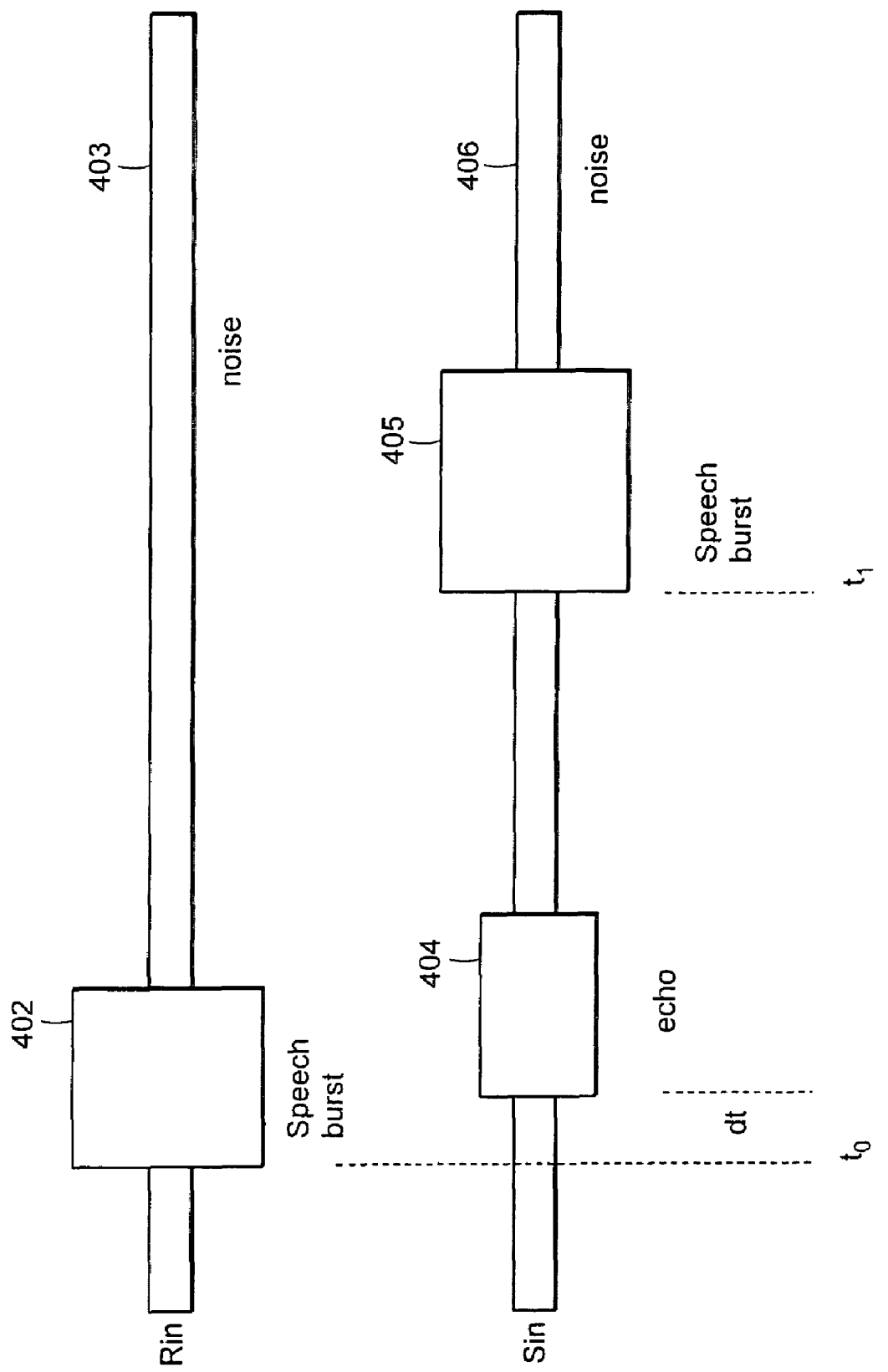
FIG. 4 is a diagram that shows a test vector pair example for use with the test arrangement of FIG. 3.

A test vector pair Rin, Sin is shown in FIG. 4. The Rin signal includes a speech burst component 402 and noise component 403. The Sin signal includes echo component 404, speech burst component 405 and noise component 406. The relative starting time and duration of the respective speech bursts of the Rin, Sin signals determines the speech activity state transitions. As noted above, the six-state Markov Chain model (Brady Model) represents all speech activity states and the transitions during a conversation as shown in FIG. 2. In FIG. 4, the starting time of the Rin speech burst component is at time $t_0$. The echo component starts at time $t=t_0+dt$, and the Sin speech burst component starts at time $t_1$.

Figure 5:
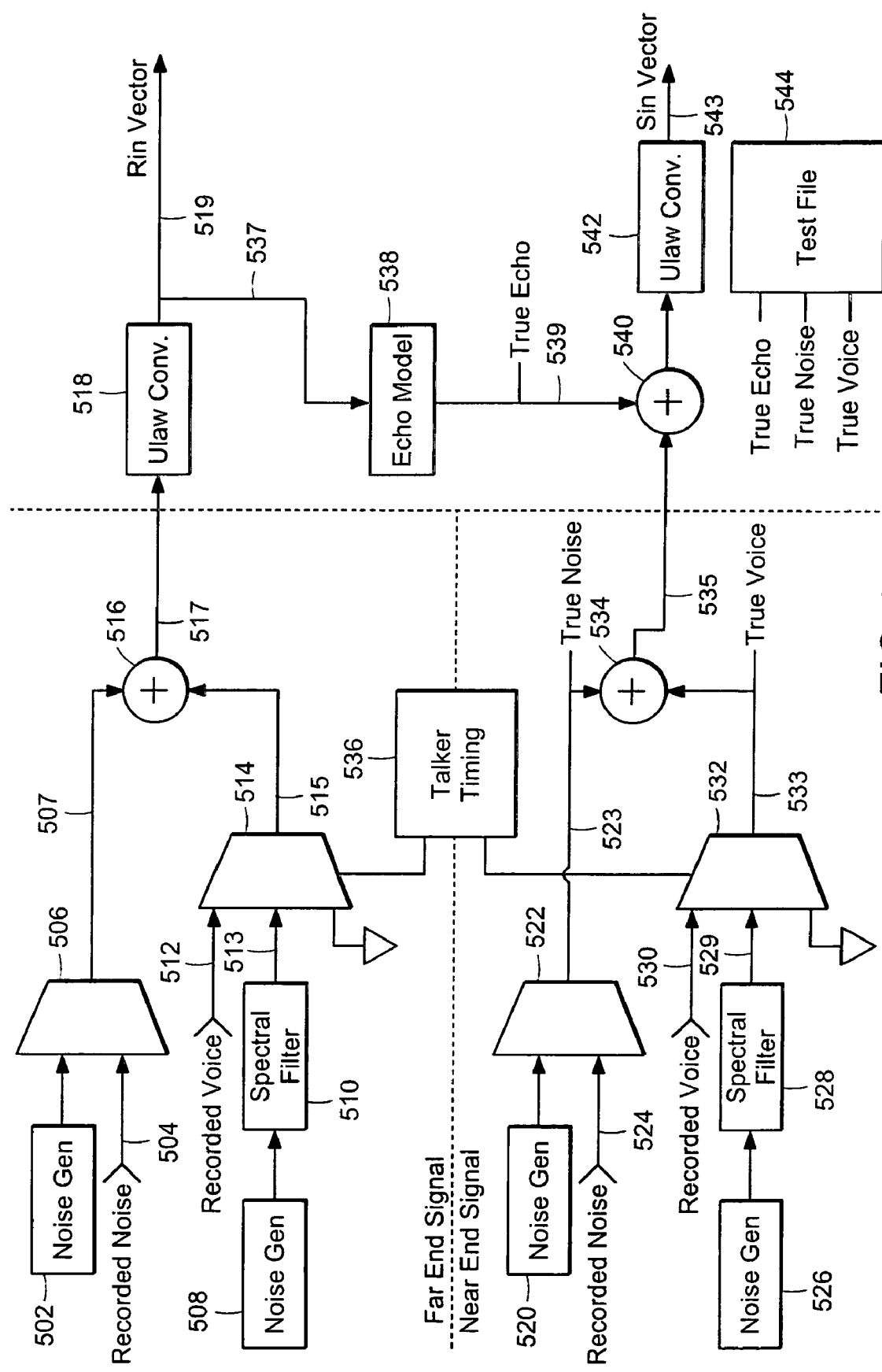
FIG. 5 is a block diagram of an embodiment of a test vector generator.

FIG. 5 illustrates a block diagram of an embodiment of a test vector generator for generating test vector pairs. A far-end signal 517 may be generated by combining at adder 516 a noise component 507 and a speech burst component 515. Selector 506 selects between a pseudo noise or Gaussian white noise sequence 502 and recorded noise 504 to provide the noise component 507. Selector 514 selects between recorded voice burst 512 and artificial speech burst 513. The speech burst 513 may be generated by passing pseudo noise or Gaussian white noise sequence 508 through a band limited filter 510. The bandwidth may be, for example, from 200 Hz to 3.6 kHz. The far-end signal 517 may be passed through µlaw converter 518 to provide Rin vector 519.

A near-end signal 535 may be generated by combining at adder 534 a noise component 523 and a speech burst component 533. Selector 522 selects between a pseudo noise or Gaussian white noise sequence 520 and recorded noise 524 to provide the noise component 523. Selector 532 selects between recorded voice burst 530 and artificial speech burst 529. The speech burst 529 may be generated by passing pseudo noise or Gaussian white noise sequence 526 through a band limited filter 528. An echo component 539 may be generated by coupling a portion of the Rin signal through echo model 538. The near-end signal 535 may be combined with the echo component 539 at adder 540 and passed through µlaw converter 542 to provide Sin vector 543.

The test vector pair Rin vector 519 and Sin vector 543 together with a test file 544 form a test unit. The test file 544 includes true echo, true noise and true voice vector information that is useful with the analysis of the Sout signal from the particular echo canceller under test.

In an embodiment, the vector generator may be developed using Vissim software to generate the Rin signal, Sin signal and test-info file for each test unit. Each test unit is assigned an id number, for example, for test unit No. 100, 3 files are generated: Rin100.pcm, Sin100.pcm, and test100.pcm.

Figure 6:
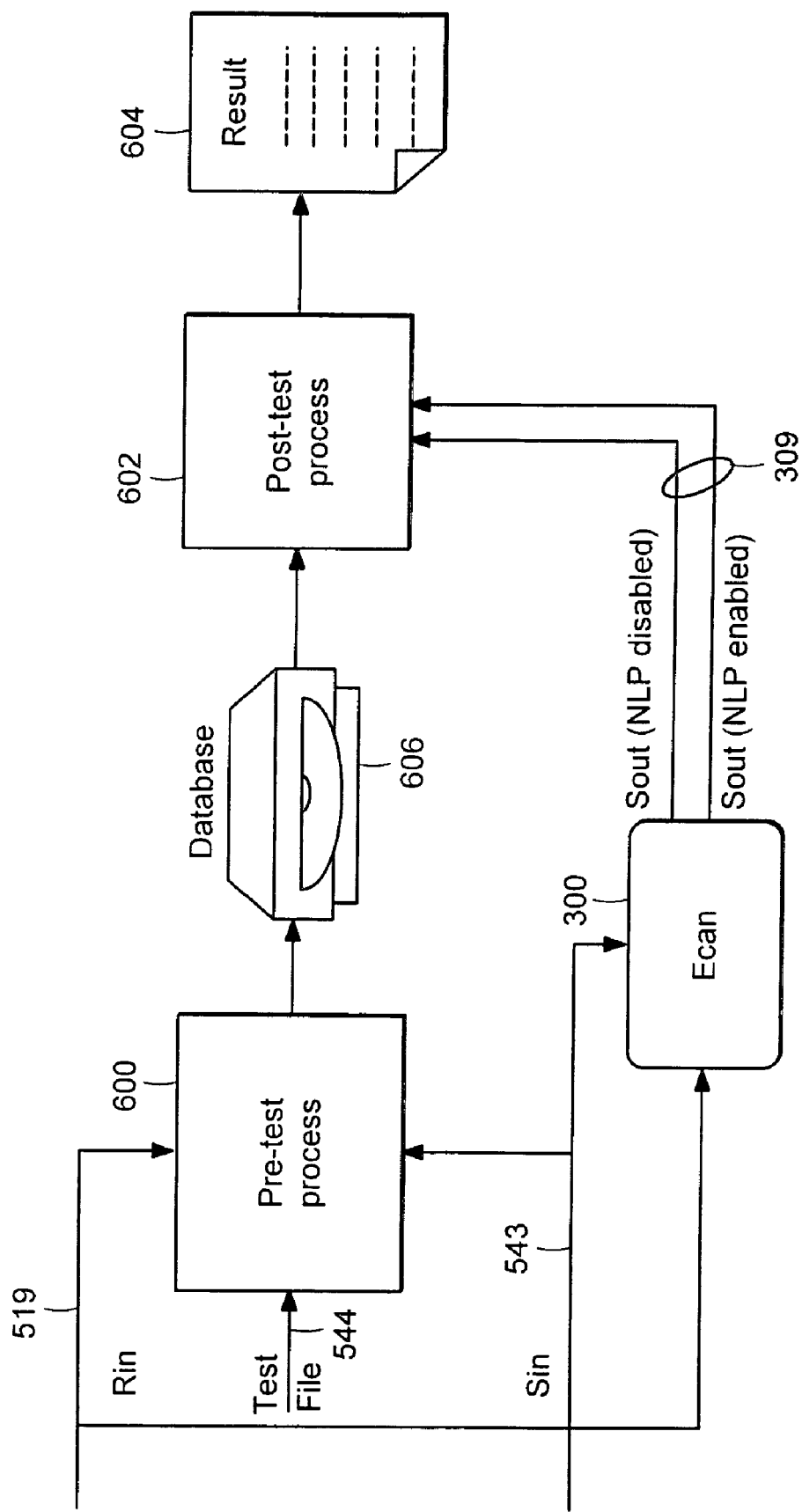
FIG. 6 illustrates an embodiment of an analysis tool.

An embodiment of an analysis tool for analyzing the Sout signal 309 (FIG. 3) generated by each test unit may be developed with Matlab language and can also be compiled to stand-alone software running under either Unix or Windows system. The analysis tool may include a pre-process portion 600 and a post-process portion 602, as shown in FIG. 6. The pre-process portion 600 takes the test-info file 544 (FIG. 5) including the Rin and Sin vectors 519, 543, converts the information into a Matlab data file with ".mat" format, and stores the converted information to database 606 for use by the post-process tool 602. Since the pre-processing does not need the involvement of the Sout signal 309, it needs to be run only once after a test vector pair unit is created. This mechanism can save the running time of the post-process tool 602. The post-process tool 602 reads the Sout signals (i.e., Sout with NLP enabled and Sout with NLP disabled) and the corresponding data files from database 606 and generates a results table file 604. The post-processing may also include reading an existing result file and performing further statistical analysis tasks, such as generating graphics, sorting and cutting the result table in different ways, calculating sub-scores for each performance parameter, comparing two result tables, etc. All of these tasks can be executed in batch mode, which means numerous test units can be processed automatically under one single command.

Figure 7:
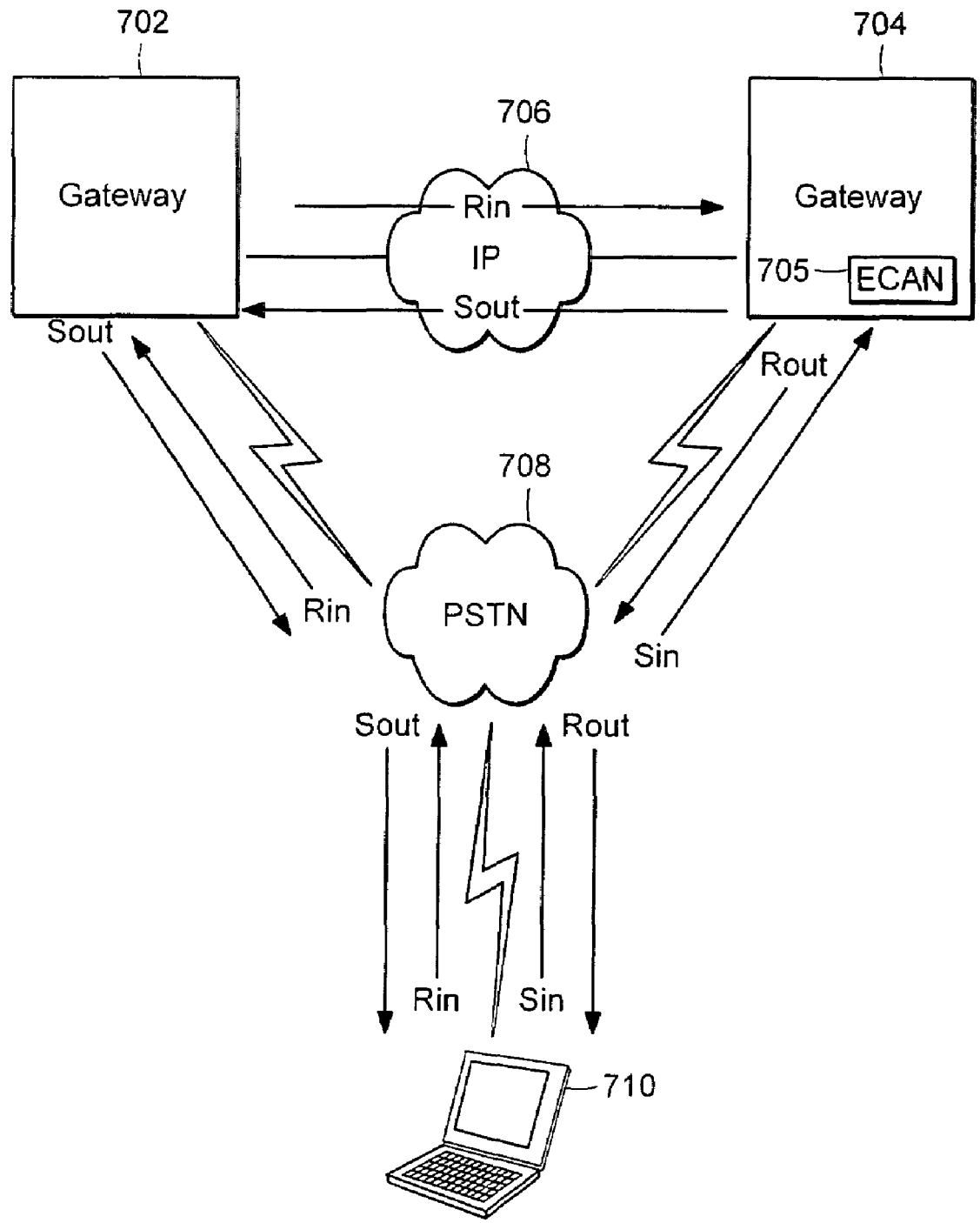
FIG. 7 is a block diagram illustrating a network test arrangement.

A network test arrangement is shown in FIG. 7 for testing an echo canceller located in a telecommunications network. In the arrangement, an originating gateway 702 is connected through a packet network 706 to a terminating gateway 704 that includes a digital echo canceller 705. The gateways 702, 704 may be any packet voice gateway (e.g., Cisco AS5400 gateways). The echo canceller 705 may be of any type as described above with respect to FIG. 1.

A signal play/record device 710 (e.g., a GLcomm device) is provided to play out the pre-generated test vector pairs Rin, Sin to the originating gateway 702 and terminating gateway 704, respectively, through a public switched telephone network 708. The signal play/record device 710 can also record the echo canceller output signal Sout at the same time. Proper echo canceller testing requires that only the target echo canceller 705 at the terminating gateway 704 is active in the transmission path. Thus, any echo canceller at the originating gateway 702 is disabled. In this way, the originating gateway 702 functions to compress, convert and forward the signals on the PSTN 708 and the packet network 706, and does not modify the signals in both directions in terms of echo. Thus, the Sout signal received and recorded at signal play/record device 710 can be considered as the accurate output of the terminating gateway's echo canceller 705.

As noted above, the Rin vector consists of far-end speech bursts and far-end noise. The Sin vector consists of near-end speech bursts, near-end noise and echo. The echo component can be either pre-generated or generated in real time. In the case of real-time generated echo, the signal play/record device 710 simulates a hybrid converter device in the PSTN network by applying an echo path filter to the received Rout signal. An additional latency, which varies from a few milliseconds to tens of milliseconds, may be introduced to the echo due to the signal processing delay. In both cases, the delay has be added manually while playing the Sin signal to compensate the transmission time that Rin takes to reach the echo canceller 705 at the terminating gateway 704. The amount of delay varies depending on several factors such as network topology, gateway jitter buffer setting and codecs. The appropriate delay value has to make the Rin and Sin vectors reach the echo canceller at the same time.

Figure 8:
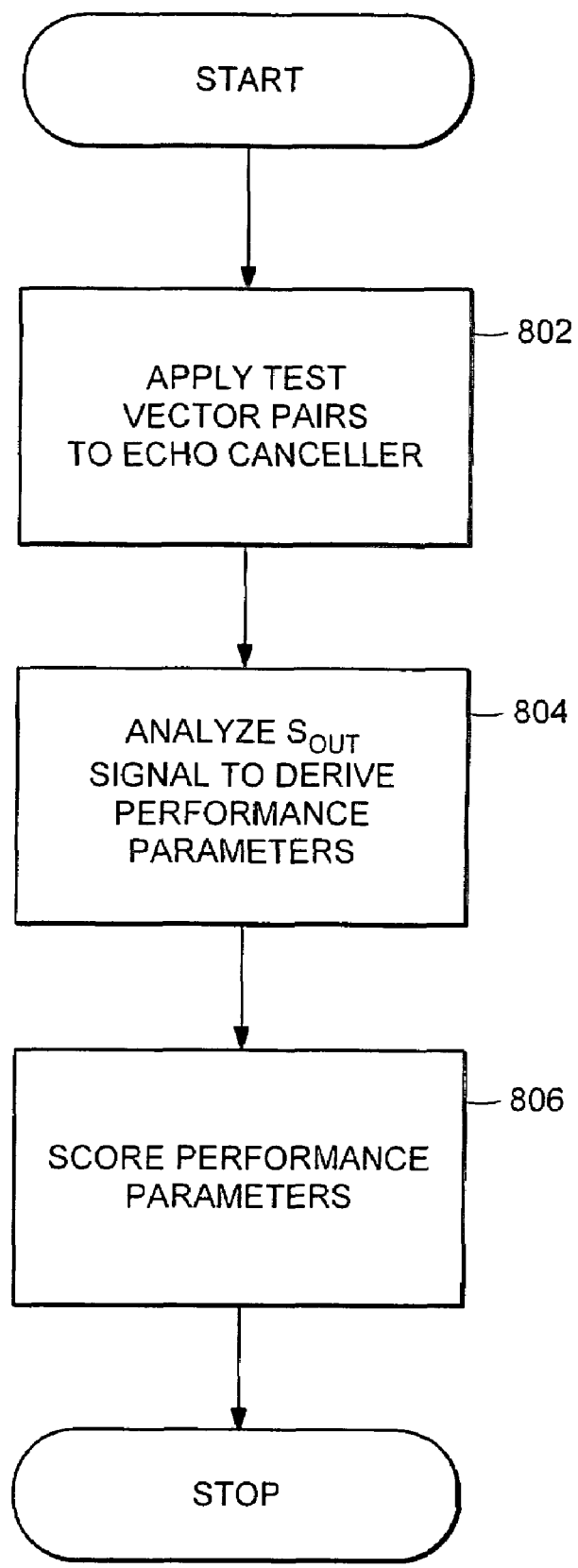
FIG. 8 is a flow diagram illustrating a process for use with the testing arrangement of FIG. 7.

A process for testing and analysis in relation to the test arrangement of FIG. 7 is shown in the flow diagram of FIG. 8. At 802, the test vector pairs generated by the test vector generator (FIG. 5) are applied to the echo canceller Rin, Sin input ports using the play/record device 710 (FIG. 7). At 804, the recorded Sout signal received at the play/record device for each test vector unit is analyzed to derive performance parameters. At 806, the performance parameters are scored in accordance with a compression function described further herein. It should be understood that any or all of the process steps may be executed by the signal play/record device 710 (FIG. 7) alone or in conjunction with another processor.

The analysis of the received Sout signal for each applied test vector unit results in derivation of several performance parameters that can be used to characterize the echo canceller under test. FIG. 9 shows a sample output table of derived performance parameters for sample test vector units (labeled in the second column from the left as sample test units 725 through 730). Details regarding derivation of the echo canceller test vector analysis output parameters shown in the table are now described.

1. ERLE (echo return loss enhancement).

ERLE measures how much echo has been cancelled by the echo canceller. It is the most important indicator regarding a echo canceller's performance. The input for an echo canceller can be expressed as:

$Rin(i)=Fv(i)+Nzf(i)$, where $Fv(i)$ is Far-end voice and $Nzf(i)$ is far-end noise $Sin(i)=Nv(i)+E(i)+Nzn(i)$, where $Nv(i)$ is near-end voice, $Nzn(i)$ is near-end noise and $E(i)$ represents the echo vector which shall be the output when $Rin(i)$ is filtered by a pre-defined filter function which simulated the echo path impulse response.

The output of an echo canceller is given as:

$Sout(i)=Nv(i)+Res(i)+Nzn(i)$, where $Res(i)$ is the residue echo.

Suppose $Nv(i)$ and $Nzn(i)$ are not distorted by the Echo canceller, we can compute the $Res(i)=Sout(i)-Nv(i)-Nzn(i)$.

Next we calculate the power level of $Res(i)$ with RMS (root mean square) method as the following equation in G.168

$$P_{res}(k) = 3.17 + 10\log\left(\frac{\sqrt{\frac{2}{n}\sum_{i=k}^{k-n+1}(Res(i))^2}}{8159}\right),$$

where $Pres(k)$ is the signal power level of residue echo in dBm0, n is the number of samples over which the RMS measurement is made.

Next, we use the same method to calculate the $Pecho(k)$ which is the RMS power level of the echo vector $E(i)$.

Therefore, we have the ERLE sequence as $ERLE(k)=Pecho(k)-Pres(k)$ in dB.

In the output table FIG. 9, there are three performance parameters regarding ERLE:
    a. ERLE_f: (shown in units of dB) The average $ERLE(k)$ during far end voice engages, but near-end voice does not engage. This parameter reflects the convergence depth of the echo canceller's adaptive filter during simple single far-end voice only period:

$$ERLE\_f = \frac{\sum_{Fv(k)\neq 0,Nv(k)=0} ERLE(k)}{N},$$

$Fv(k) \neq 0, Nv(k) = 0$.

N is total number of samples when
    b. ERLE_75: (shown in units of dB) The average $ERLE(k)$ from 75 ms to 100 ms when far-end voice engages and near-end voice does not engage. This parameter reflects the convergence speed of the echo canceller.

$$ERLE\_75 = \frac{\sum_{Fv(k)\neq 0,Nv(k)=0,k=[75,100]} ERLE(k)}{N},$$

N is total number of samples
when, $Fv(k)\neq 0, Nv(k)=0, k=[75\ ms,\ 100\ ms]$
    c. ERLE_d: (shown in units of dB) The average $ERLE(k)$ during double talk. This parametert reflects the extent of convergence of the echo canceller's adaptive filter during the double-talk period:

$$ERLE\_d = \frac{\sum_{Fv(k)\neq 0,Nv(k)\neq 0} ERLE(k)}{N},$$

N is the total number of samples
when $Fv(k) \neq 0, Nv(k)\neq 0$

Figure 10:
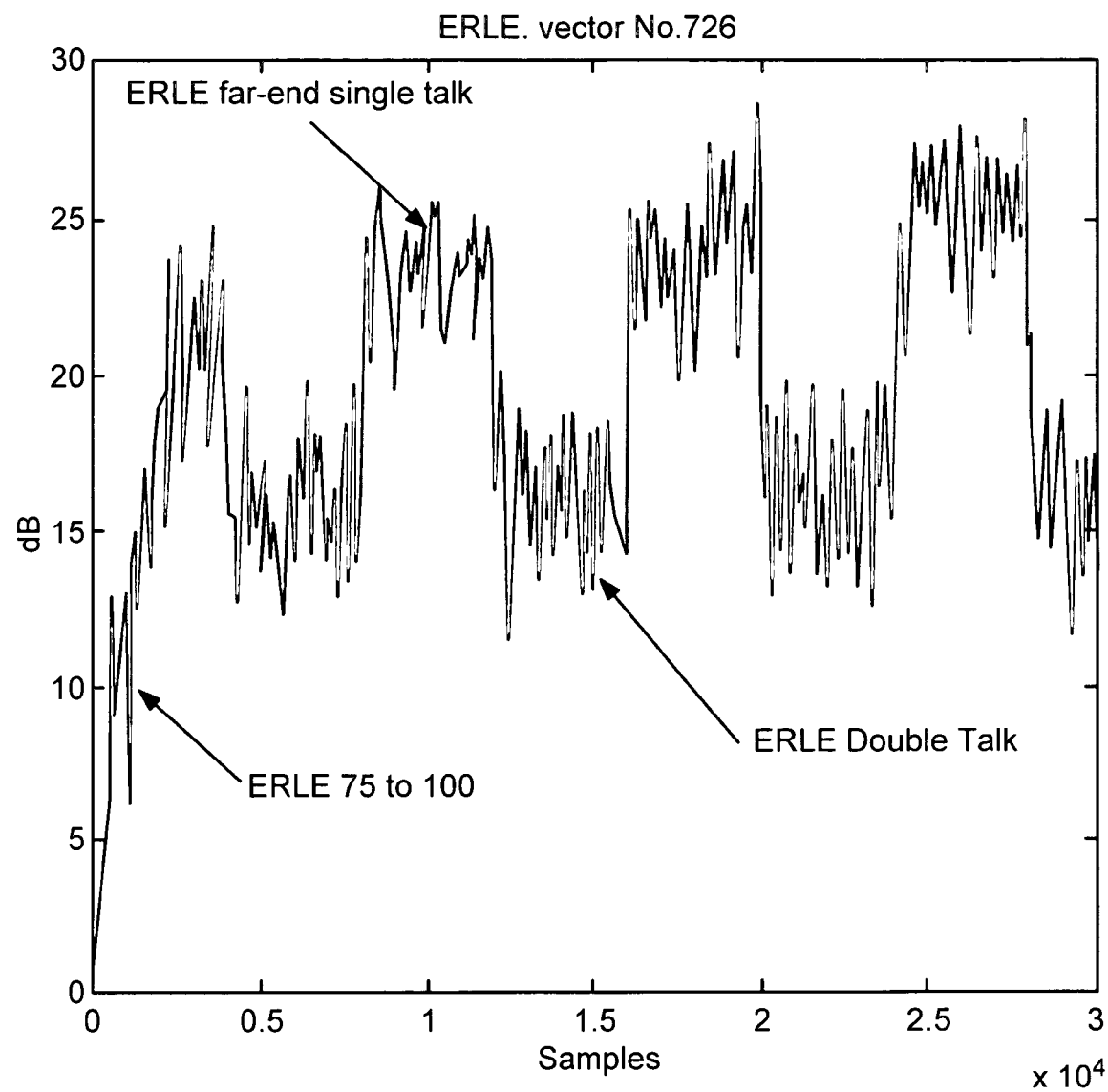
FIG. 10 is a graph showing a sample result for a sample test vector.

FIG. 10 shows for a particular test vector unit the ERLE parameters derived from NLP disabled Sout signal: ERLE_f (far-end single talk), ERLE_75 and ERLE_d (double talk).

2. DIV_DUR: (shown in units of milliseconds)

This parameter represents, after the echo canceller's adaptive filter converges, the maximum duration in time that $ERLE(k)$ continuously drops below a pre-defined threshold. This parameter indicates the extent of divergence of the echo canceller during the entire far-end talking and double talking period.

$$DIV\_DUR = \underset{i}{Max}(k_2(i) - k_1(i)),$$

where $ERLE([k_1(i),k_2(i)])<$threshold

3. NV_LOSS: (shown in units of milliseconds)

This parameter represents the maximum continuous near-end speech loss duration when the non-linear processor is engaged. To obtain this parameter, the $Sout(i)$ and $Nv(i)$ are compared whenever near end voice is engaged. When the power level difference goes beyond a threshold, we call it a near-end voice loss. First, we use RMS method to calculate the power level of $Sout(i)$ and $Nv(i)$, then calculate $$NV\_LOSS = \underset{i}{Max}(k_2(i) - k_1(i)),$$

where $P_{sout}([k_1(i),\ k_2(i)])-P_{Nv}([k_1(i),k_2(i)])<$threshold, $Nv(k)$
$\neq 0$ 4. RE_CORR: (shown as %)

This parameter is the correlation between the far-end speech and the $Sout(i)$ when the far-end voice is engaged and near-end voice does not engage. In this period, the NLP should be in "On" state. If it fails to do so, some echo will be leaked into the $Sout(i)$, therefore, the correlation can indicate how much the leakage is:

RE_CORR=corr($E(i)$,   Sout($i$)),   when,   $Fv(i)\neq 0$,
$Nv(i)=0$

5. DIF_CNG: (shown in units of dB)

This parameter represents the power level difference between the true background noise and the comfort noise. When NLP is engaged, the echo canceller tends to replace the signal in $Sin(i)$ with the artificial comfort noise signal. The comfort noise can be expressed as $Sout(i)$, where $Fv(i)\sim=0$ and $Nv(i)=0$. Its power level and power spectrum shape should be close enough to the measured true noise level and spectrum. First we estimate the power spectrum density for the comfort noise signal, then we divide the estimated power spectrum density into M frequency bins and calculate the average power levels for each bin. Let PWcng(i), $1<=i<=M$, represent the power levels of comfort noise level corresponding to M (e.g., M=32) frequency bands, and let PWnz(i), $1<=i<=M$ represent the true input noise power levels which are known already. Therefore we have:

DIF_CNG=Average($abs$(PWcng($i$)−PWnz($i$))).

This is the average comfort noise level difference across all M frequency bands.

Referring again to FIG. 9, the right most column indicates a composite score for the echo canceller for each particular test vector unit. The composite score is a weighted average of sub-scores for the seven performance parameters. Each sub-score is computed by applying a Sigmoid Squashing scoring function to the performance value. The scoring function is represented as the following equation:

score=100/(1+exp($k$($b$−$X$))), where $k$=4/($L2$−$L1$),
    $b$=($L1$+

Figure 11:
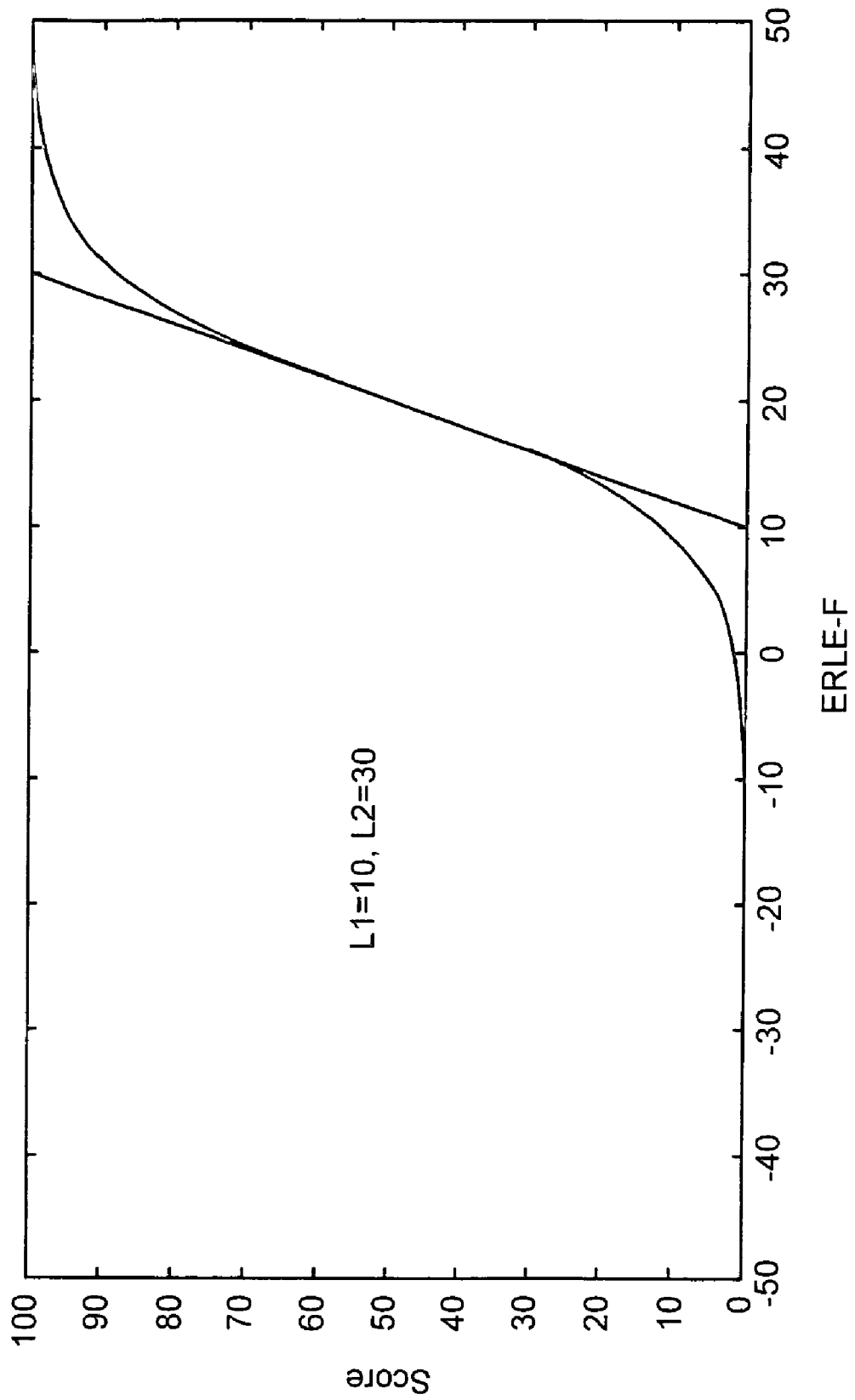
FIG. 11 is a diagram that illustrates a scoring compression function.

L1 and L2 define the boundaries of a most-interested region of performance parameter X. In the [L1, L2] region, the score Y and parameter value X have near-linear relation. In this way, the parameter X can be compressed and converted into sub-score between 0 and 100. A sample graph of the function when L1=10, L2=30 for parameter ERLE_f is shown in FIG. 11.

With the scoring as described, echo canceller performance can be more objectively characterized. This allows for improved comparisons between echo canceller implementations. Compared to other methods of testing echo cancellers, the present approach provides a quantitative methodology that provides better metrics for useful performance evaluation.

It should be understood that, while the embodiments described herein are based on arrangements that include VoIP gateways, other embodiments in accordance with the principles of the invention may have digital circuit switches or other switches well-known in a TDM network, without having VoIP nodes present. That is, the principles of the present invention are applicable for use with digital echo cancellers in both VoIP and TDM applications.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of testing an echo canceller having receive input (Rin), receive output (Rout), send input (Sin) and send output (Sout) ports, the method comprising:
   applying at least one test vector signal pair to the respective Rin, Sin ports;
   analyzing the Sout signal generated to derive plural performance parameters;
   scoring each performance parameter by a compression function to provide a sub-score for each performance parameter; and
   weighting the sub-scores and averaging the weighted sub-scores to provide an overall performance score to characterize the echo canceller.

2. The method of claim 1 wherein the at least one test vector signal pair represents a particular speech activity state transition.

3. The method of claim 2 wherein the speech activity state transitions are Brady Model transitions.

4. The method of claim 1 wherein the Rin test vector signal includes a speech component and a noise component.

5. The method of claim 1 wherein the Sin test vector signal includes a speech component, a noise component and an echo component.

6. The method of claim 1 wherein the performance parameters include echo return loss enhancement (ERLE).

7. The method of claim 6 wherein the performance parameters include ERLE during a far-end single talk speech activity state.

8. The method of claim 6 wherein the performance parameters include ERLE during a double talk speech activity state.

9. The method of claim 6 wherein the performance parameters include ERLE during an initial interval of a far-end single talk speech activity state.

10. The method of claim 6 wherein the performance parameters include maximum divergence duration in the event ERLE drops below a threshold.

11. The method of claim 1 wherein the performance parameters include near-end voice clipping, residue echo leakage and comfort noise power.

12. The method of claim 1 wherein the performance parameters include parameters associated with a non-linear processor of the echo canceller being enabled.

13. The method of claim 1 wherein the performance parameters include parameters associated with a non-linear processor of the echo canceller being disabled.

14. The method of claim 1 wherein the echo canceller is located at a terminating gateway coupled to an originating gateway across a packet network and applying includes sending the Rin test vector signal to the originating gateway and sending the Sin test vector signal to the terminating gateway through a circuit switched network.

15. The method of claim 1 further comprising generating at least one test vector signal pair by combining a first speech component and a first noise component to provide the Rin test vector signal and combining a second speech component, a second noise component and an echo component to provide the Sin test vector signal.

16. The method of claim 15 wherein the first speech component and the second speech component are both periodic speech bursts having low correlation.

17. The method of claim 15 wherein at least one of the first and second speech components is a periodic artificial speech burst.

18. The method of claim 15 wherein at least one of the first and second speech components includes recorded voice.

19. The method of claim 15 wherein the first and second noise components comprise continuous noise sequence.

20. The method of claim 15 wherein the echo component is pre-generated.

21. The method of claim 15 wherein the echo component is generated by applying an echo path model in real time or near real time.

22. The method of claim 1 wherein scoring includes scoring each performance parameter by a sigmoid squashing function.

23. A computer program product having a computer readable medium including computer program logic recorded thereon that, when executed on a computer processor, causes the processor to:

apply a series of test vector signal pairs to the respective Rin, Sin ports of an echo canceller;

analyze the Sout signal at the Sout port of the echo canceller generated by each test vector signal pair to derive plural performance parameters;

score each performance parameter by a compression function to provide a sub-score for each performance parameter; and weight the sub-scores and average the weighted sub-scores to provide an overall performance score to characterize the echo canceller.

24. Apparatus for testing an echo canceller having receive input (Rin), receive output (Rout), send input (Sin) and send output (Sout) ports, the apparatus comprising:

means for applying a series of test vector signal pairs to the respective Rin, Sin ports;

means for analyzing the Sout signal generated by each test vector signal pair to derive plural performance parameters;

means for scoring each performance parameter by a compression function to provide a sub-score for each performance parameter; and means for weighting the sub-scores and averaging the weighted sub-scores to provide an overall performance score to characterize the echo canceller.

* * * * *